United States Patent [19]

Denzinger et al.

[11] Patent Number: 4,532,320

[45] Date of Patent: Jul. 30, 1985

[54] REMOVAL OF PHYSIOLOGICALLY UNACCEPTABLE SOLVENTS FROM POLYMERS CONTAINING CARBOXYL OR ANHYDRIDE GROUPS

[75] Inventors: Walter Denzinger, Speyer; Heinrich Hartmann, Limburgerhof; Gerhard Faulhaber, Bad Durkheim; Hans-Juergen Rauben Heimer, Ketsch, all of Fed. Rep. of Germany

[73] Assignee: BASF Aktiengesellschaft, Ludwigshafen, Fed. Rep. of Germany

[21] Appl. No.: 572,240

[22] Filed: Jan. 20, 1984

[30] Foreign Application Priority Data

Jan. 26, 1983 [DE] Fed. Rep. of Germany ....... 3302495

[51] Int. Cl.$^3$ .............................................. C08F 6/00
[52] U.S. Cl. ..................... 528/498; 424/78; 528/497
[58] Field of Search ............................... 528/497, 498

[56] References Cited

U.S. PATENT DOCUMENTS

| | | | |
|---|---|---|---|
| 3,461,108 | 8/1969 | Heilman | 528/498 |
| 3,706,703 | 12/1972 | Heilman | 528/503 |
| 3,890,283 | 6/1975 | Casey et al. | 528/481 |
| 4,012,461 | 3/1977 | van Brederode | 528/498 |
| 4,138,539 | 2/1979 | Landolt et al. | 526/93 |
| 4,145,526 | 3/1979 | Vanlautem et al. | 528/481 |
| 4,293,668 | 10/1981 | Heimsch | 528/498 |

FOREIGN PATENT DOCUMENTS 0031713 12/1980 European Pat. Off. .

*Primary Examiner*—Christopher A. Henderson
*Attorney, Agent, or Firm*—Oblon, Fisher, Spivak, McClelland & Maier

[57] ABSTRACT

Physiologically unacceptable solvents are removed from polymers containing carboxyl or anhydride groups by a process in which the polymer is treated with aliphatic hydrocarbons at a temperature which is no lower than the lower limit of the softening range of the polymer.

5 Claims, No Drawings

REMOVAL OF PHYSIOLOGICALLY UNACCEPTABLE SOLVENTS FROM POLYMERS CONTAINING CARBOXYL OR ANHYDRIDE GROUPS

BACKGROUND OF THE INVENTION

Polymers containing carboxyl or anhydride groups are of great importance for a large variety of applications. For example, polyacrylic or polymethacrylic acids having a low degree of crosslinking, copolymers of $C_2$–$C_4$-olefins with maleic anhydride and copolymers of $C_1$–$C_4$-alkyl vinyl ethers with maleic anhydride are used as thickeners in the textile printing, cosmetics and pharmaceuticals sectors. Copolymers of maleic anhydride with methyl vinyl ether, in the form of the monoester with a monohydric $C_1$–$C_4$-alcohol, are becoming increasingly important as binders for hair sprays. Optimum polymers for this purpose are medium molecular weight or high molecular weight polymers which are generally prepared by precipitation polymerization in solvents in which the monomers are soluble and the resulting polymer is insoluble. Particularly suitable solvents for the precipitation polymerization are those which have a low transfer constant in the polymerization, such as benzene, toluene and chlorohydrocarbons, eg. carbon tetrachloride, dichloroethane and trichloroethane. Benzene, dichloroethane and trichloroethane are usually used. Since these solvents are physiologically unacceptable, they have to be substantially removed from the polymers before the latter are used, particularly when they are employed in the cosmetics sector. To do this, the polymer suspensions are usually dried in a drier, such as a spray drier, a fluidized-bed drier, a paddle drier or a similar apparatus. Even after thorough drying at relatively high temperatures and under reduced pressure for a relatively long time, the residual content of physiologically unacceptable solvents in the polymer is usually from 1 to 3% by weight. For example, a polyacrylic acid which had a low degree of crosslinking and was polymerized in benzene still had a residual benzene content of 1.4% by weight after it had been heated for 24 hours at 80° C. under 0.01 mbar. Products having such a high benzene content are unsuitable for industrial use.

DESCRIPTION OF THE PRIOR ART

If, for example, polymers are suspended in a nontoxic solvent, such as an aliphatic or cycloaliphatic hydrocarbon, in which the polymers are insoluble but the physiologically unacceptable solvent is soluble, the suspension is stirred for 24 hours and the hydrocarbon is then vaporized, it is found that the physiologically unacceptable solvent in the polymer has not been exchanged but, if anything, its content remains constant. Such an extraction process, which has however a different object, ie. the separation of low molecular weight polymers from higher molecular weight ones, is disclosed in, for example, EP-A31 713.

SUMMARY OF THE INVENTION

It is an object of the present invention to reduce the content of physiologically unacceptable solvents in polymers containing carboxyl or anhydride groups.

We have found that this object is achieved, in accordance with the invention, by a process for removing physiologically unacceptable solvents from polymers containing carboxyl or anhydride groups, wherein the polymers are treated with aliphatic hydrocarbons at a temperature which is no lower than the lower limit of the softening range of the polymer. The polymers are preferably treated at or above their glass transition temperature.

DETAILED DESCRIPTION OF THE INVENTION

Examples of suitable carboxyl-containing polymers are the homopolymers and copolymers of ethylenically unsaturated $C_3$–$C_5$-carboxylic acids, such as acrylic acid, methacrylic acid, crotonic acid and itaconic acid. The copolymers contain from 70 to 99.9% by weight of these monomers. Used as thickeners, preferred polymers are crosslinked polymers of carboxylic acids or maleic anhydride. These polymers are obtained by copolymerization of an ethylenically unsaturated carboxylic acid in the presence of an ethylenically diunsaturated or polyunsaturated monomer. Depending on the degree of crosslinking of the polymers, from 0.001 to 10, preferably from 0.2 to 5% by weight of an ethylenically polyunsaturated monomer is used as a crosslinking agent. Examples of suitable crosslinking agents are divinylbenzene, divinyl ketone, buta-1,4-diene, ethylene glycol diacrylate, methylenebisacrylamide, diallyl phthalate, divinyl ether, divinyldioxane, polyalkenyl polyethers, such as polyallyl and polyvinyl ethers of oligosaccharides, such as pentaallyl sucrose, pentaerythritol triallyl ether, diallylacrylamide, polyallyl- and polyvinylsilanes, triallyl cyanurate, allyl esters of phosphonic acid and phosphorous acid, and allylphosphoramido compounds, such as phosphoric acid monoethyl ester N,N-diamide and diallyldiamide as well as mixtures of these monomers. Since, when used as thickeners, the crosslinked polyacrylic acids are subjected to harsh hydrolyzing conditions, polymers which are stable to hydrolysis are preferably prepared using those cross-linking agents which show no tendency to cleavage under strongly acidic or strongly basic conditions. These include, for example, divinylbenzene, divinyldioxane, tetravinylsilane, tetraallylsilane and pentaerythritol triallyl ether.

The carboxyl-containing crosslinked polymers can, if desired, be modified with as much as 20% by weight of another ethylenically unsaturated compound; examples of suitable compounds for this purpose are amides and esters of ethylenically unsaturated $C_3$–$C_5$-mono- and dicarboxylic acids, eg. acrylamide, methacrylamide, esters of acrylic acid or methacrylic acid with a monohydric $C_1$–$C_8$-alcohol, acrylonitrile, methacrylonitrile, vinyl acetate, vinyl propionate, vinyl alkyl ether and acrylamidomethylpropanesulfonic acid. This group of comonomers is incorporated as copolymerized units in an amount such that the resulting polymers are still soluble, or can be swelled, in aqueous alkaline systems.

Suitable anhydride-containing polymers are copolymers of maleic anhydride with $C_2$–$C_4$-olefins and styrene, or copolymers of maleic anhydride with $C_1$–$C_4$-alkyl vinyl ethers. These copolymers contain 50 mole % of maleic anhydride.

The copolymers containing carboxyl or anhydride groups are prepared by precipitation polymerization in an organic solvent in which the monomers are soluble and the copolymer is insoluble. The solvent must be inert to the monomers and the copolymers. Preferably used solvents are those which have a low transfer constant in the polymerization, eg. benzene, toluene or a chlorohydrocarbon, such as carbon tetrachloride, dichloroethane or trichloroethane. However, these solvents are physiologically unacceptable and have to be removed from the polymers to a very substantial extent.

In order to prevent agglomeration of the precipitated polymer particles during the polymerization, and to obtain highly concentrated polymer suspensions, it is frequently advantageous to use protective colloids. Suitable protective colloids are polymers which are very hydrophilic and which dissolve satisfactorily in the solvent used in the precipitation polymerization. Examples of suitable compounds are polyalkyl ethers, eg. polyvinyl methyl ether, homopolymers and copolymers of vinylpyrrolidone with, for example, vinyl esters, such as vinyl acetate and/or vinyl propionate, or acrylates and methacrylates; anhydrous homopolymers of vinylpyrrolidone are preferred. The protective colloid is used in an amount of from 0.1 to 10, preferably from 0.3 to 3%. The monomer concentration is from 5 to 20 % by weight when the polymerization is carried out in the absence of a protective colloid, and is from 20 to 40% by weight when a protective colloid is used.

In order to obtain polymers having a very high molecular weight, the polymerization is carried out as a rule at 80° C. or below, preferably at from 40° to 75° C. It is carried out in the presence of a conventional polymerization initiator, such as a peroxide, a hydroperoxide, an azo compound or a redox catalyst, or of a mixture of polymerization initiators.

As stated above, it is difficult completely to remove physiologically unacceptable hydrocarbons, for example aromatic hydrocarbons, such as benzene, toluene, xylene or chlorohydrocarbons, eg. carbon tetrachloride, dichloroethane, trichloroethane or tetrachloroethane, from the polymers obtained in the precipitation polymerization. Hence, these polymers are first isolated by substantially removing the particular physiologically unacceptable solvent used in the precipitation polymerization, this being done by, for example, filtration, decantation or distillation and drying. The remaining pulverulent polymer is then treated, in accordance with the invention, with an aliphatic hydrocarbon at a temperature which is no lower than the lower limit of the softening range of the polymer. Suitable aliphatic hydrocarbons are the physiologically acceptable $C_5$-$C_{18}$, preferably $C_7$-$C_{12}$, aliphatic hydrocarbons, eg. pentane, heptane, octane, nonane, decane, dodecane, paraffin oil, cyclohexane, methylcyclohexane, dimethylcyclohexane and cyclooctane, as well as mixtures of various hydrocarbons, eg. mixtures of n-octane with methylcyclohexane.

The polymers containing carboxyl or anhydride groups are treated with the aliphatic hydrocarbons at a temperature which is no lower than the lower limit of the softening range of the polymers, preferably at their glass transition temperature. The lower limit of the softening range of the polymers can be readily determined, for example on a Kofler bench, as the range in which the polymer particles begin to cake together.

The glass transition temperature (for a definition of this see B. Vollmert, Grundriss der Makromolekularen Chemie, vol. IV (1979), 146–153) can be determined just as readily as the lower limit of the softening range of the polymer. For example, the glass transition temperature of a polyacrylic acid having a low degree of crosslinking is 129° C., and the lower limit of the softening range for the polymer is 125° C.; the polymer is completely molten at 134° C. A molar copolymer of maleic anhydride and ethylene, with a K value of 120, had a glass transition temperature of 13920 C.; the lower limit of the softening range was 135° C., and the mass was completely molten at 143° C. A molar copolymer obtained from maleic anhydride and isobutene and having a low degree of crosslinking had a glass transition temperature of 165° C.; the lower limit of the softening range for the polymer was 161° C., and the polymer was completely molten at 169° C. A molar copolymer of maleic anhydride and methyl vinyl ether, with a K value of 50, had a glass transition temperature of 159° C.; the lower limit of the softening range in this case was 154° C. and the polymer was completely molten at 163° C.

The lower limit of the softening range of the polymers, as well as their glass transition temperature, can be substantially reduced by the addition of solvents in which the polymers are soluble. Such solvents should of course be physiologically acceptable in order to be suitable for use in the novel process. Examples of useful solvents for the polymers are ketones, eg. acetone, methyl ethyl ketone and diethyl ketone, esters, eg. methyl acetate, ethyl acetate and butyl acetate, and tetrahydrofuran and dimethylformamide. The stated solvents can be used for carboxyl-containing polymers as well as carboxylic anhydride-containing polymers, whereas solvents which react with carboxylic anhydride groups, eg. alcohols, are used only for reducing the glass transition temperature and the lower limit of the softening range of carboxyl-containing polymers, examples of such solvents being alcohols, such as methanol, ethanol, propanol, isopropanol and butanol. From 1 to 10%, preferably from 2 to 5%, based on the aliphatic hydrocarbon, of a solvent for the polymers is used. As a result of adding the solvent to the aliphatic hydrocarbons, the temperature at which the polymers are treated is substantially reduced, so that thermal damage to the polymers is substantially avoided. For example, when a solvent mixture consisting of 95 parts of n-octane and 5 parts of acetone is used in a 20% strength suspension, the glass transition temperature of a polyacrylic acid having a low degree of crosslinking can be reduced from 129° C. to 85° C.

In order to remove the physiologically unacceptable solvent from the polymer, the latter is conventionally suspended in an aliphatic hydrocarbon in a concentration of from 5 to 50, preferably from 20 to 40% by weight, and is heated, in the form of the suspension, to a temperature which is no lower than the lower limit of the softening range of the polymer, preferably to the glass transition temperature of the latter. Provided that the polymer suspended in the aliphatic hydrocarbon is not heated to a temperature at which it is completely molten, the treatment according to the invention once again gives a pulverulent polymer. If, on the other hand, the polymer is heated to above its melting point, ie. to a temperature at which the polymer is completely molten, agglomeration of the polymer particles takes place, and the latter may even coalesce. In this case, the polymer has to be comminuted after the treatment according to the invention. The treatment is carried out at from 60° to 200° C.

The polymer obtained in the precipitation polymerization still contains physiologically unacceptable solvents; this polymer is dried, and can then furthermore be treated in an extraction column by first heating the hydrocarbon to a temperature which is no lower than the glass transition temperature of the polymer and then introducing this hydrocarbon onto the extraction column. Such a treatment can advantageously be carried out in a Soxhlet apparatus. In other cases, it may also be advantageous to heat the polymer in an aliphatic hydrocarbon whose boiling point corresponds to the glass transition temperature of the polymer, to remove the physiologically unacceptable solvent from the mixture via a column, if appropriate as an azeotropic mixture with the extracting agent, and then to isolate the polymer from the suspension in a conventional manner and to dry it.

The method and duration of the treatment of the carboxyl-containing and anhydride-containing polymers with an aliphatic hydrocarbon depend on various factors. Where a large amount of a physiologically unacceptable solvent is to be removed, the latter is advantageously removed from the system by, for example, distillation. The treatment of the polymers lasts, for example, from a few minutes to a few hours. In general, the physiologically unacceptable solvents can be removed from the polymers containing carboxyl or anhydride groups in the course of from 1 to 3 hours.

In the Examples which follow, parts and percentages are by weight. The K values were determined in accordance with H. Fikentscher, Cellulose-Chemie 32 (1932), 58–64 and 71–74. The residual solvent contents of the polymers were determined by gas chromatography, and the glass transition temperatures were measured by the DSC method (cf. B. Vollmert, Grundriss der Makromolekularen Chemie, Vol. IV (1979), 146–153, Verlag E. Vollmert, Karlsruhe).

EXAMPLE 1

(a) 80 parts of n-octane were initially taken in a vessel which was capable of being heated and was provided with a stirrer and an apparatus which permitted the use of a nitrogen atmosphere. 20 parts of a polyacrylic acid which had been polymerized in benzene and crosslinked to a low degree with divinyldioxane and contained 1.8% of residual benzene were then added, while stirring. The lower limit of the softening range for the polymer was 115° C., and the glass transition temperature was 125° C. The suspension was then stirred for 3 hours at 24° C., after which the n-octane was removed by evaporation in a rotary evaporator, and the residue was dried for 3 hours at a bath temperature of 70° C. under reduced pressure from a water pump. The polymer then still contained 1.6% of benzene.

(b) Example 1(a) was repeated, except that the temperature at which the polymer was treated was increased to 85° C. After this treatment, the polymer still contained 1.8% of benzene.

(c) Example 1(a) was repeated, except that the temperature at which the treatment was carried out was increased to 115° C. The resulting polymer contained 0.4% of benzene.

(d) Example 1(a) was repeated, except that the temperature at which the treatment was carried out was increased to 125° C. The benzene content of the treated polymer was 0.08%.

Examples (c) and (d) show that the benzene content of polyacrylic acid having a low degree of crosslinking can be decisively reduced by treatment with n-octane only at the lower limit of the softening range or at the glass transition temperature of the polymer.

EXAMPLE 2

Example 1(a) was repeated, except that the polyacrylic acid used had a low degree of crosslinking and differed from that described in Example 1 only in respect of the benzene content, which was 3%. Table 1 shows the duration of the treatment of the polymer at 125° C. and the benzene content of the polymer determined after the treatment.

TABLE 1

| Example 2 | Time | Benzene content of the dry product [%] |
|---|---|---|
| a | 6 minutes | 0.3 |
| b | 20 minutes | 0.3 |
| c | 1 hour | 0.16 |
| d | 1.5 hours | 0.09 |
| e | 2 hours | 0.07 |
| f | 3 hours | 0.07 |

EXAMPLE 3

The polyacrylic acid having a low degree of crosslinking and described in Example 1 was suspended in 80 parts of a mixture of 95 parts of n-octane and 5 parts of a solvent in which the stated polyacrylic acid is soluble. It was then treated under the conditions shown in Table 2, and, after the treatment, the pulverulent solid product was isolated as described in Example 1a.

TABLE 2

| Example 3 | Extracting agent | Conditions | Benzene content of the dry product [%] |
|---|---|---|---|
| a (comparison) | 95 parts of n-octane 5 parts of acetone | 24 hours at room temperature | 1.9 |
| b | as for (a) | 3 hours at 85° C. | 0.09 |
| c (comparison) | 95 parts of n-octane 5 parts of isopropanol | 24 hours at room temperature | 1.8 |
| d | as for (c) | 3 hours at 85° C. | 0.08 |

The addition of acetone or isopropanol to n-octane in the stated amounts reduced the glass transition temperature of the above polyacrylic acid from 129° to 85° C.

EXAMPLE 4

30 parts of a polyacrylic acid which had been prepared in trichloroethane and crosslinked to a low degree with pentaerythritol triallyl ether and had a mean particle diameter of 0.05 mm and a residual trichloroethane content of 1.4% were suspended in 70 parts of n-octane in the apparatus described in Example 1, and the suspension was heated for 3 hours at each of the temperatures shown in Table 3. The solid product was then isolated by evaporating the solvent, and was dried for 3 hours at a bath temperature of 70° C. and under 15 mbar. The glass transition temperature of the polymer was 125° C., and the lower limit of the softening range was 115° C.

TABLE 3

| Example 4 | Temperature [°C.] | Residual trichloroethane content [%] | n-Octane |
|---|---|---|---|
| a (comparison) | 24 | 1.4 | 0.1 |
| b | 115 | 0.4 | 0.2 |
| c | 125 | 0.06 | 0.2 |

EXAMPLE 5

20 parts of a 1:1 copolymer of maleic anhydride and ethylene, prepared by precipitation polymerization in 1,2-dichloroethane and having a particle diameter of 0.1 mm and a residual content of 1,2-dichloroethane of 2.4%, were suspended in 80 parts of methylcyclohexane, and the suspension was heated for 1 hour at 139° C. under superatmospheric pressure. The suspension was cooled, and the polymer was then filtered off and dried in a drying oven at 60° C. and under a reduced pressure of 20 mbar. After the treatment with methylcyclohexane, the particulate polymer contained only 0.05% of 1,2-dichloroethane. The glass transition temperature of the polymer was 139° C.

When, for comparison, 20 parts of the above copolymer in 80 parts of methylcyclohexane were treated for 24 hours at room temperature and the methylcyclohexane was then evaporated, the resulting polymer still contained 2.3% of 1,2-dichloroethane.

EXAMPLE 6

(a) 20 parts of a 1:1 copolymer of maleic anhydride and isobutene, which was additionally crosslinked with 0.8% of pentaerythritol triallyl ether and had a residual toluene content of 4.2% and a particle diameter of 0.05 mm, were heated in 80 parts of a solvent mixture of 95 parts of cyclohexane and 5 parts of ethyl acetate for 3 hours at 100° C. The suspension was then evaporated to dryness in a rotary evaporator, and the powder was dried for 3 hours at 70° C. It then contained 0.09% of toluene. As a result of the presence of ethyl acetate in the cyclohexane, the glass transition temperature of the polymer was reduced from 165° C. to 100° C.

(b) For comparison, Example 6(a) was repeated, except that the polymer was treated for 24 hours at room temperature. After the solvent had been evaporated in the conventional manner, the resulting polymer still contained 4.2% of toluene.

EXAMPLE 7

20 parts of a finely divided 1:1 copolymer of maleic anhydride with vinyl methyl ether, which was prepared by precipitation polymerization in benzene and had a K value of 60 and a residual benzene content of 2.3%, were heated in 100 parts of a mixture of 50 parts of nonane and 50 parts of decane, at the boiling point of the mixture. 40 parts of the solvent mixture were distilled off in the course of 2 hours. The benzene content of the distillate was 1.1%. The suspension was cooled, and then evaporated down in a rotary evaporator at 80° C. and under 20 mbar. The polymer treated in this manner contained 0.03% of benzene, and its glass transition temperature was 160° C. The boiling point of the solvent mixture was 161° C.

We claim:

1. A process for removing physiologically unacceptable solvents from a polymer containing carboxyl or anhydride groups, said polymer being selected from the group consisting of homopolymers and copolymers of ethylenically unsaturated $C_3$–$C_6$-carboxylic acids, copolymers of maleic anhydride with $C_2$–$C_4$-olefins, copolymers of maleic anhydride with styrene, copolymers of maleic anhydride with $C_1$–$C_4$-alkyl vinyl ethers, and crosslinked copolymers obtained by copolymerization of said carboxylic acids and maleic anhydride in the presence of an ethylenically diunsaturated or polyunsaturated monomer, wherein the polymer is treated with aliphatic hydrocarbons at a temperature which is at or above its glass transition temperature.

2. A process for removing physiologically unacceptable solvents from a polymer containing carboxyl or anhydride groups, said polymer being selected from the group consisting of homopolymers and copolymers of ethylenically unsaturated $C_3$–$C_5$-carboxylic acids, copolymers of maleic anhydride with $C_2$–$C_4$-olefins, copolymers of maleic anhydride with styrene, copolymers of maleic anhydride with $C_1$–$C_4$-alkyl vinyl ethers, and crosslinked copolymers obtained by copolymerization of said carboxylic acids and maleic anhydride in the presence of an ethylenically diunsaturated or polyunsaturated monomer, wherein the polymer is treated with aliphatic hydrocarbons at a temperature which is at or above the glass transition temperature of the polymer which is lowered by adding to the hydrocarbons from 1 to 10% by weight based on the aliphatic hydrocarbon of a physiologically acceptable solvent for the polymer which is non-reactive with the polymer under the treatment conditions.

3. A process as claimed in claim 1, wherein the aliphatic hydrocarbons or mixtures of aliphatic hydrocarbons used have, under standard conditions of temperature and pressure, a boiling point which is in the region of the glass transition temperature of the polymer.

4. A process as claimed in claim 1, wherein the physiologically unacceptable solvent extracted from the polymer is distilled off from the polymer suspension.

5. A process as claimed in claim 1, wherein a polyacrylic acid having a low degree of crosslinking, or a copolymer of a $C_2$–$C_4$-olefin with maleic anhydride or o a $C_1$–$C_4$-alkyl vinyl ether with maleic anhydride, is used as the polymer containing carboxyl or anhydride groups.

* * * * *